(12) United States Patent
Crabtree et al.

(10) Patent No.:   US 12,577,991 B2
(45) Date of Patent:     Mar. 17, 2026

(54) PRESSURE MODULATING CLUTCH CONTROL ASSEMBLY

(71) Applicant: Caterpillar Inc., Peoria, IL (US)

(72) Inventors: Aaron B. Crabtree, Metamora, IL (US); John M. Seipold, Peoria, IL (US); Nathan J Adams, Metamora, IL (US); Caitlyn D. Eng, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/744,911

(22) Filed: Jun. 17, 2024

(65) Prior Publication Data

US 2025/0382995 A1     Dec. 18, 2025

(51) Int. Cl.
  F16D 48/02       (2006.01)
  F16D 48/06       (2006.01)
  F16D 48/08       (2006.01)

(52) U.S. Cl.
  CPC .......... F16D 48/02 (2013.01); F16D 48/066 (2013.01); F16D 48/08 (2013.01); *F16D 2048/0203* (2013.01); *F16D 2048/0257* (2013.01); *F16D 2048/0269* (2013.01); *F16D 2048/0281* (2013.01)

(58) Field of Classification Search
  CPC ............. F16D 48/02; F16D 2048/0203; F16D 2048/0221; F16D 2048/0257; F16D 2048/0266; F16D 2048/0269; F16D 2048/0281; F16D 48/04; F16D 48/06; F16D 48/066; F16D 48/08; F16D 25/14;

F16D 2500/1026; F16D 2500/1027; F16D 2500/10412; F16D 2500/1045; F16D 2500/5014; F16D 2500/50203; F16D 2500/50239

See application file for complete search history.

(56) References Cited

U.S. PATENT DOCUMENTS

| 3,848,620 | A | * | 11/1974 | Fisher | .................... F16D 25/14 |
| | | | | | 137/116.3 |
| 4,046,162 | A | | 9/1977 | Rodeghiero | |
| 4,281,676 | A | * | 8/1981 | Morris | .................. F16D 48/02 |
| | | | | | 137/625.6 |

(Continued)

FOREIGN PATENT DOCUMENTS

IN         202141019756 A     11/2022

*Primary Examiner* — Richard M Lorence

(74) *Attorney, Agent, or Firm* — Bookoff McAndrews PLLC

(57)           ABSTRACT

In one instance, disclosed herein is a pressure modulating clutch control assembly that includes: a valve assembly configured to apply a clutch pressure to a clutch device; a pressure modulation assembly in fluid communication with the valve assembly and configured to control a maximum pressure level that the clutch pressure reaches; and a modular relief valve in fluid communication with the valve assembly and the pressure modulation assembly, the modular relief valve forming part of a hydraulic feedback loop between the valve assembly and the pressure modulation assembly, wherein the hydraulic feedback loop is configured such that an increase in a modulation pressure of a pressurized fluid within the pressure modulation assembly causes a corresponding increase in the clutch pressure until the clutch pressure reaches the maximum pressure level.

19 Claims, 4 Drawing Sheets

(56) References Cited

U.S. PATENT DOCUMENTS

| | | | |
|---|---|---|---|
| 4,411,345 A * | 10/1983 | Haight .................. | B60T 11/106 |
| | | | 192/12 C |
| 4,865,176 A | 9/1989 | Blake et al. | |
| 5,007,309 A | 4/1991 | Lemon et al. | |
| 5,601,506 A | 2/1997 | Long et al. | |
| 7,794,349 B2 | 9/2010 | Gierer et al. | |

* cited by examiner

PRESSURE MODULATING CLUTCH CONTROL ASSEMBLY

TECHNICAL FIELD

The present disclosure relates generally to clutch control assemblies, and more particularly, to a pressure modulating clutch control assembly.

BACKGROUND

A clutch is a mechanical device that may be engaged and disengaged to selectively couple and decouple two rotatable shafts. When the clutch is engaged, the two rotatable shafts are coupled by the clutch, such that a rotation of one shaft causes rotation of the other shaft. When the clutch is disengaged, the two rotatable shafts are decoupled, such that a rotation of one shaft does not cause a rotation in the other shaft. In the case of a motorized vehicle or machine, a clutch selectively couples and decouples the output shaft of an engine and the input shaft of a transmission. In doing so, the clutch allows the vehicle or machine to change gears while the engine is in operation.

A clutch may selectively couple and decouple two rotatable shafts through pressure applied to one or more plates. For example, an output shaft of an engine of a motorized vehicle may terminate with a first plate, e.g., a flywheel. A clutch coupled to an input shaft of the vehicle's transmission may include a second plate, e.g., a clutch disc, configured to engage with the first plate when pressure is applied to the second plate, thereby coupling the output shaft of the engine to the input shaft of the transmission. However, if pressure is applied to the second plate too quickly, an abrupt coupling of the output shaft of the engine and the input shaft of the transmission may cause the engine to stall, increase wear, or even potentially cause damage to the engine or transmission. Furthermore, a clutch is often only manually operated or only automatically operated, preventing an operator from manually operating a clutch configured for automatic (e.g., electronic) control.

A shift modulation control valve is described in U.S. Pat. No. 4,046,162 (the '162 patent) to Rodeghiero. The shift modulation control valve of the '162 patent may provide a uniform pressure rise to a clutch so as to provide a smooth shift engagement of a power shift transmission through the use of an accumulator piston. However, the '162 patent does not disclose an assembly that allows a clutch to be operated manually or automatically, nor an assembly that allows for pressure to be applied to a clutch in a series of stages including a modulation stage including a hydraulic feedback loop.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, a clutch control assembly may include: a valve assembly configured to apply a clutch pressure to a clutch device; a pressure modulation assembly in fluid communication with the valve assembly and configured to control a maximum pressure level that the clutch pressure reaches; and a modular relief valve in fluid communication with the valve assembly and the pressure modulation assembly, the modular relief valve forming part of a hydraulic feedback loop between the valve assembly and the pressure modulation assembly, wherein the hydraulic feedback loop is configured such that an increase in a modulation pressure of a pressurized fluid within the pressure modulation assembly causes a corresponding increase in the clutch pressure until the clutch pressure reaches the maximum pressure level.

In another aspect, a pressure modulating clutch control assembly may include: a valve assembly in fluid communication with a clutch device; and a pressure modulation assembly in fluid communication with the valve assembly, wherein the valve assembly and the pressure modulation assembly are configured to function cooperatively to apply a clutch pressure to the clutch device in a series of stages, including: a clutch fill stage, in which the clutch pressure applied to the clutch device increases from a standby pressure level to a touch-up pressure level at a first unmodulated rate; a pressure modulation stage, in which the clutch pressure applied to the clutch device increases from the touch-up pressure level to a fully-engaged pressure level at a modulated rate; and a maximum pressurization stage, in which the clutch pressure applied to the clutch device increases from the fully-engaged pressure level to the maximum pressure level at a second unmodulated rate.

In another aspect, a pressure modulating clutch control assembly may include: a valve assembly in fluid communication with a clutch device and including a manually-actuated clutch valve, an electrohydraulic clutch valve, and a selector valve operative to selectively activate or deactivate the manually-actuated clutch valve and the electrohydraulic clutch valve; and a pressure modulation assembly, wherein, when either the manually-actuated clutch valve or the electrohydraulic clutch valve is activated by the selector valve, the valve assembly and the pressure modulation assembly function cooperatively to apply a clutch pressure to the clutch device and modulate the clutch pressure applied to the clutch device.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
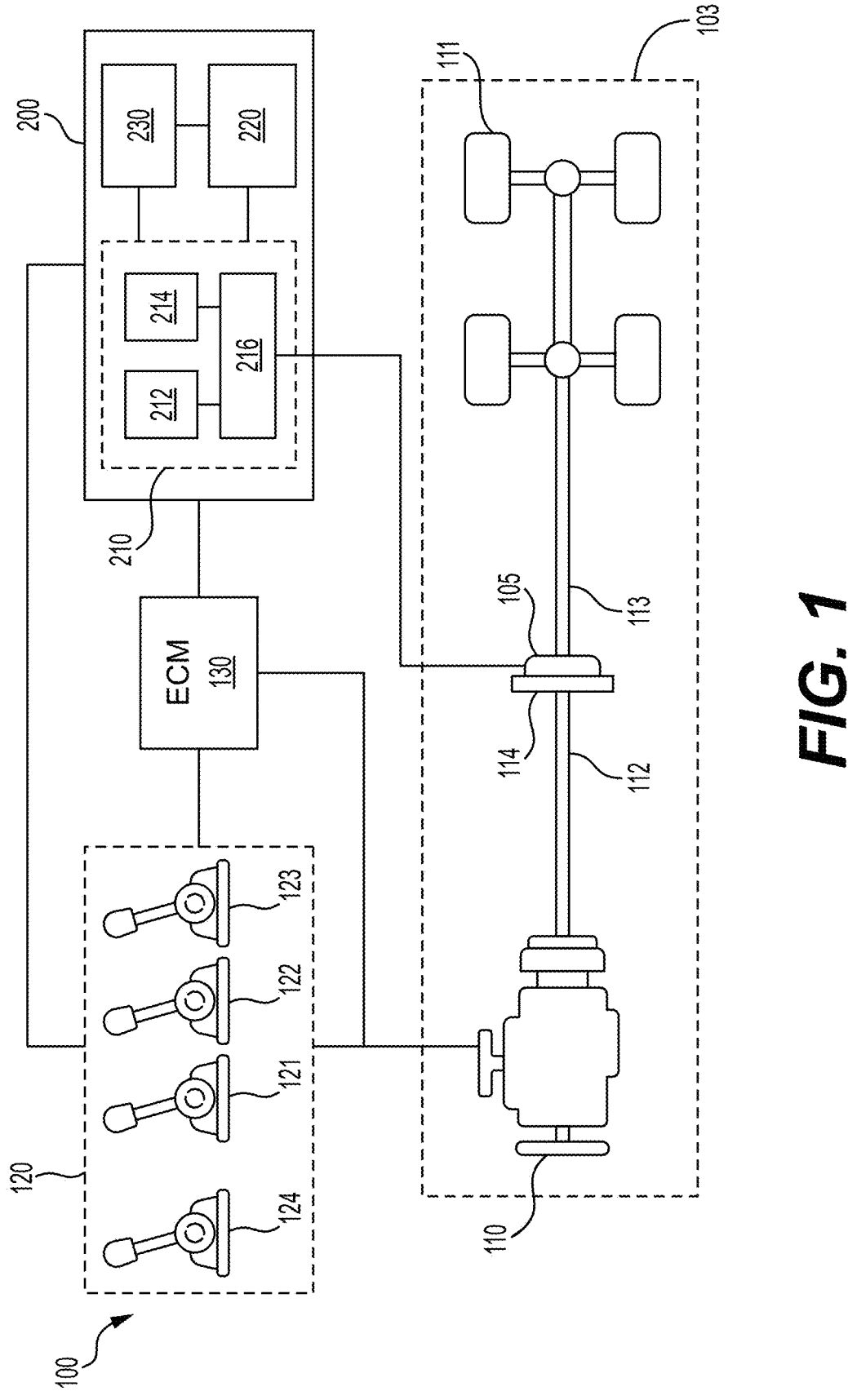
FIG. 1 depicts a block diagram of a motorized vehicle including an exemplary pressure modulating clutch control assembly and an exemplary operator interface.

FIG. 1 depicts a block diagram of a machine 100 (e.g., a motorized vehicle or stationary machine) including an exemplary pressure modulating clutch control assembly 200 and an exemplary operator interface 120. The machine 100 may include a drive train 103 including an engine 110 and a transmission 111. In some examples, the machine 110 includes a generator, hydraulic pump, or other system to facilitate propulsion, power generation, or the performance of work. As mentioned above, a clutch device 105 (also referred to as a "clutch") may be operative to selectively couple and decouple two rotatable shafts, such as an output shaft 112 of the engine 110 and an input shaft 113 of the transmission 111, thereby allowing the machine 100 to stop and/or change gears while the engine 110 is in operation. For example, the output shaft 112 of the engine 110 may terminate at a flywheel 114. Clutch 105 may be coupled to the input shaft 113 of the transmission 111 and may include a clutch disc (not shown) configured to engage with the flywheel 114 when a threshold amount of pressure is applied to the clutch disc. When the threshold amount of pressure is applied to the clutch disc, friction between the clutch disc and the flywheel 114 effectively adheres the clutch disc to the flywheel 114. In such an engaged state, the adherence of the clutch disc to the flywheel 114 allows rotation of the output shaft 112 of the engine 110 to cause rotation of the input shaft 113 of the transmission 111. When the threshold amount of pressure is not applied to the clutch disc, the clutch disc disengages with the flywheel 114. In such a disengaged state, rotation of the output shaft 112 of the engine 110 does not cause rotation of the input shaft 113 of the transmission 111. Pressure applied to the clutch 105, e.g., to the clutch disc of the clutch 105, may be referred to as a "clutch pressure".

As described in further detail below, a pressure modulating clutch control assembly 200 (as referred to as a "CCA") included in the machine 100 may cause a clutch pressure to be applied to the clutch 105 in a modulated manner. For example, the CCA 200 may include a valve assembly 210 in fluid communication with a clutch 105 and a pressure modulation assembly 220 in fluid communication with the valve assembly 210. The valve assembly 210 and the pressure modulation assembly 220 may function cooperatively to receive a pressurized fluid (e.g., a hydraulic fluid) and use the pressurized fluid to apply a clutch pressure to a clutch 105 and/or increase the clutch pressure in a series of stages, at least one of which is a pressure modulation stage in which the clutch pressure increases at a modulated rate.

The CCA 200 may further include a modular pressure relief valve 230 in fluid communication with the valve assembly 210 and the pressure modulation assembly 220 and configured to facilitate a hydraulic feedback loop between the valve assembly 210 and the pressure modulation assembly 220. By applying the clutch pressure to the clutch 105 in a controlled or modulated manner, the clutch pressure applied to the clutch 105 may be increased in a way that is smoother, more consistent, and safer for one or more components of the machine 100. As described in further detail below, the CCA 200 may additionally or alternatively allow the clutch 105 to be manually operated (e.g., in a manual mode) or automatically operated (e.g., in an electrohydraulic mode), and/or facilitate toggling between manual operation of the clutch 105 and automatic operation of the clutch 105.

For example, the valve assembly 210 of the CCA 200 may include an electrohydraulic clutch valve 212, a manually-actuated clutch valve 214, and a selector valve 216 operative to selectively activate and deactivate the electrohydraulic clutch valve 212 and the manually-actuated clutch valve 214. By allowing the clutch 105 to be manually (e.g., physically) operated or electro-hydraulically (e.g., automatically) operated, the CCA 200 provides the machine 100 with greater operational flexibility and operational redundancy.

The machine 100 may further include an operator interface 120 and one or more controllers, e.g., electronic control module (ECM) 130. As depicted in FIG. 1, the operator interface 120 may be operatively coupled to the ECM 130, and both the operator interface 120 and the ECM 130 may be operatively coupled to the CCA 200. Similarly, both the operator interface 120 and the ECM 130 may be operatively coupled to one or more components of the drive train 103. For example, the operator interface 120 may include one or more interface elements for controlling one or more components of the drive train 103, such as a throttle 121 and a brake 122 (e.g., a lever, pedal, switch, joystick, yoke, etc.). Inputs received by the one or more interface elements may be communicated directly to the one or more components of the drive train 103, or may be first communicated to the ECM 130 and then communicated by the ECM 130 to the one or more components of the drive train 103. Or for example, the operator interface 120 may include a clutch mechanism 123 (e.g., a clutch lever or clutch pedal) for actuating the clutch 105 and a selector mechanism 124 for actuating the selector valve 216. When the selector mechanism 124 is actuated such that the selector valve 216 activates the electrohydraulic clutch valve 212 and deactivates the manually-actuated clutch valve 214 (as described in further detail below), inputs received by the clutch mechanism 123 may be first communicated to the ECM 130 and then communicated by the ECM 130 to the CCA 200. When the selector mechanism 124 is actuated such that the selector valve 216 activates the manually-actuated clutch valve 214 and deactivates the electrohydraulic clutch valve 212 (as described in further detail below), inputs received by the clutch mechanism 123 may be communicated directly to the CCA 200.

Figure 2:
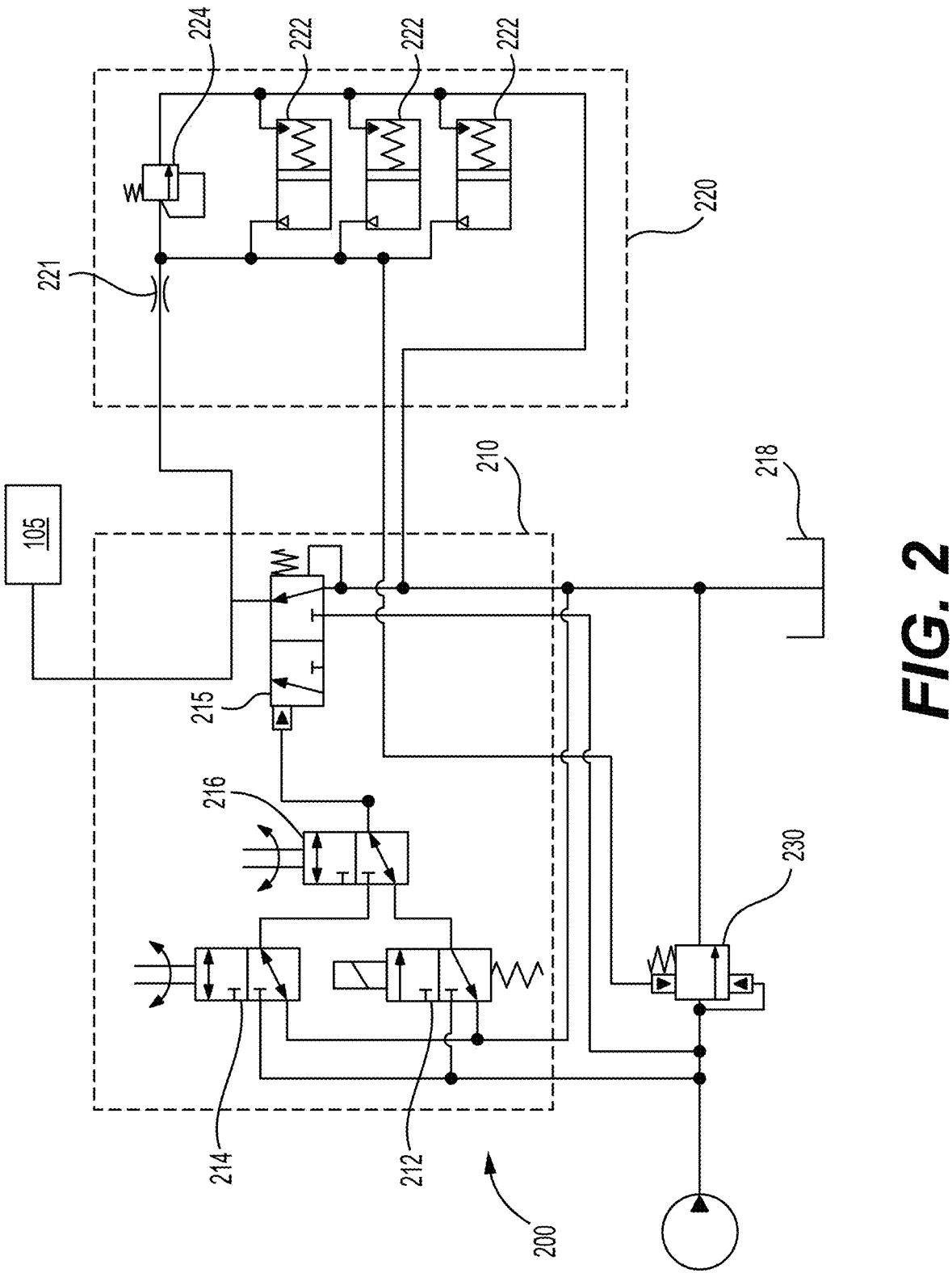
FIG. 2 depicts a hydraulic system diagram of an exemplary pressure modulating clutch control assembly.

FIG. 2 depicts a hydraulic system diagram of an exemplary pressure modulating clutch control assembly (CCA) 200. As mentioned above, the CCA 200 may include a valve assembly 210 and a pressure modulation assembly 220 in fluid communication with the valve assembly 210. As depicted in FIG. 2, the valve assembly 210 may include a plurality of valves, such as the electrohydraulic clutch valve 212, the manually-actuated clutch valve 214, and the selector valve 216. The electrohydraulic clutch valve 212 may be a multi-position valve having a first (on) position and a second (off) position (the second position being depicted in FIG. 2). When CCA 200 is in the electrohydraulic mode, the electrohydraulic clutch valve 212 may be electronically actuated by the ECM 130, either in response to input received from an operator, e.g., through the operator interface 120, or automatically, e.g., without receiving input from an operator. The manually-actuated clutch valve 214 may be a multi-position valve having a first (on) position and a second (off) position (the second position being depicted in FIG. 2) that the manually-actuated clutch valve may actuate between. When the CCA 200 is in the manual mode, the manually-actuated clutch valve 214 may be manually or physically actuated, e.g., through the use of the clutch mechanism 123 of the operator interface 120. The selector valve 216 may be a multi-position valve having a first (electrohydraulic) position and a second (manual) position. The selector valve 216 may be manually or physically actuated, e.g., by the selector mechanism 124.

When the selector valve 216 is actuated into its first (electrohydraulic mode) position, the electrohydraulic clutch valve 212 is effectively activated, such that the electrohydraulic clutch valve 212 being actuated into its first (on) position causes the CCA 200 to provide a pressurized fluid (e.g., through multi-position valve 215, as described in further detail below) to a clutch 105 in fluid communication with the CCA 200. Also, when the selector valve 216 is in its first (electrohydraulic mode) position, the manually-actuated clutch valve 214 is effectively deactivated, such that the manually-actuated clutch valve 214 being actuated into its first (on) position) does not cause the CCA 200 to provide the pressurized fluid to the clutch 105. Conversely, when the selector valve 216 is actuated into its second (manual mode) position, the manually-actuated clutch valve 214 is effectively activated, such that the manually-actuated clutch valve 214 being actuated into its first (on) position causes the CCA 200 to provide the pressurized fluid to the clutch 105. Also, when the selector valve 216 is in the second (manual mode) position, the electrohydraulic clutch valve 212 is effectively deactivated, such that the electro-hydraulic clutch valve 212 being actuated into its first (on) position does not cause the CCA 200 to provide the pressurized fluid to the clutch 105.

However, whichever position the selector valve 216 is actuated into, the CCA 200 will not provide the pressurized fluid to a clutch 105 in fluid communication with the CCA 200 unless the appropriate clutch valve is actuated into its respective first (on) position. For example, in the example depicted by FIG. 2, although the selector valve 216 is in its first (electrohydraulic mode) position, thereby activating the electrohydraulic clutch valve 212 and deactivating the manually-actuated clutch valve 214, the CCA 200 will not provide a pressurized fluid to the clutch 105, because the electrohydraulic clutch valve 212 is in its second (off) position. Similarly, in the example depicted by FIG. 2, if the selector valve 216 were to be actuated into its second (manual mode) position, thereby activating the manually-actuated clutch valve 214 and deactivating the electrohy-draulic clutch valve 212, the CCA 200 would still not provide the pressurized fluid to the clutch 105, because the manually-actuated clutch valve 214 is in its second (off) position.

Figure 4:
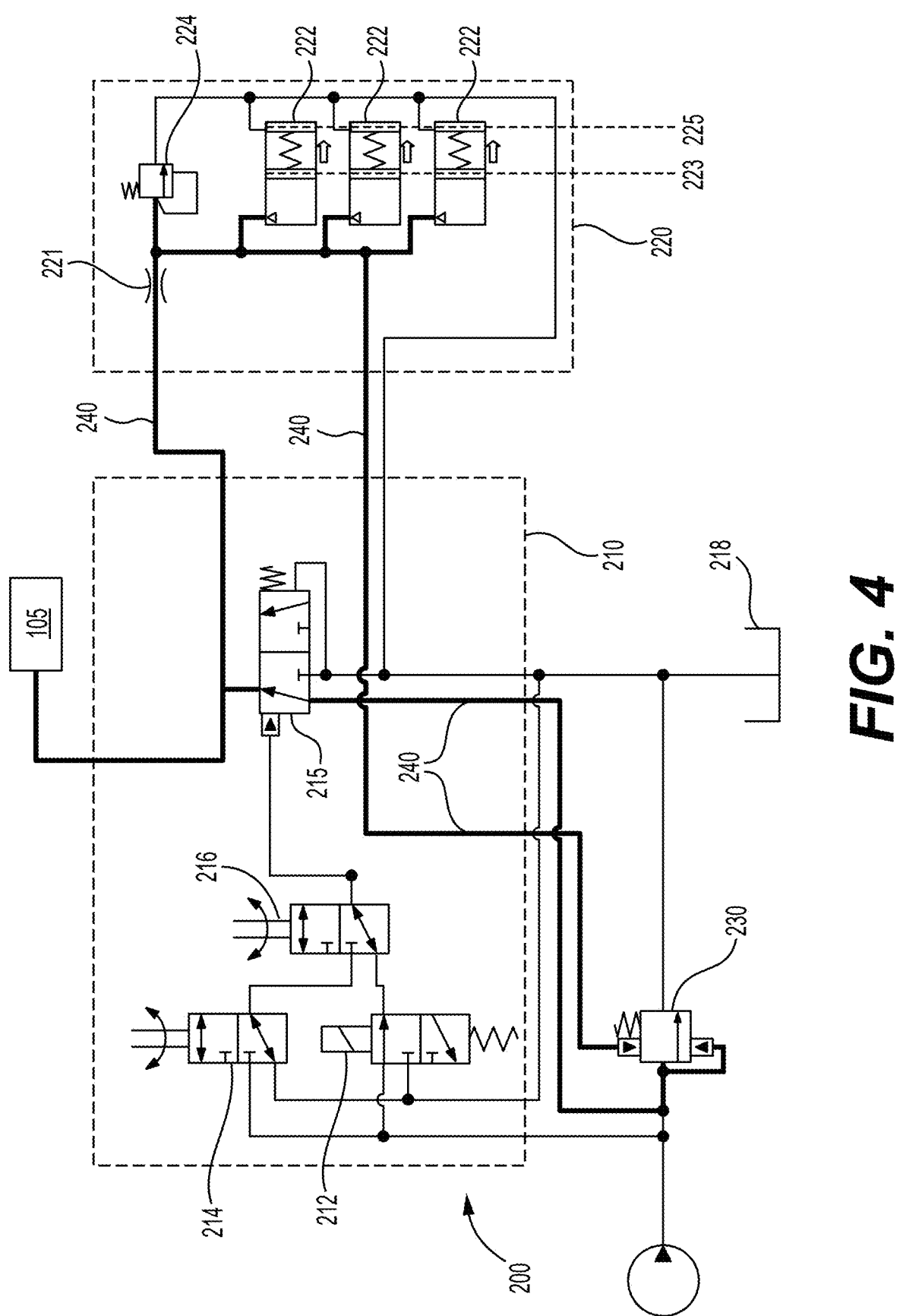
FIG. 4 depicts a hydraulic system diagram of an exemplary pressure modulating clutch control assembly.

Thus, FIG. 2 depicts the CCA 200 in a disengaged state in which no pressurized fluid is provided to the clutch 105 in fluid communication with the CCA 200. As described in further detail below, FIG. 4 depicts the CCA 200 in an engaged state in which a pressurized fluid is provided to the clutch 105 in fluid communication with the CCA 200, because the selector valve 216 is actuated into its first (electrohydraulic mode) position, thereby activating the electrohydraulic clutch valve 212, and the electrohydraulic clutch valve 212 is actuated into its first (on) position. The pressurized fluid may be provided to the clutch 105 in fluid communication with the CCA 200, thereby applying a clutch pressure to the clutch 105, through a multi-position valve 215, which may be included in the valve assembly 210 or in another component of CCA 200.

As mentioned above, the valve assembly 210 and the pressure modulation assembly 220 may function coopera-tively to receive a pressurized fluid and use the pressurized fluid to apply a clutch pressure to a clutch 105 and/or increase the clutch pressure in a controlled or modulated manner. The pressure modulation assembly 220 may include one or more pressure modulation orifices 221 and/or one or more pressure accumulators 222. The one or more pressure modulation orifices 221 and/or the one or more pressure accumulators 222 may function cooperatively to control the rate at which the clutch pressure applied to the clutch 105 increases, e.g., during a pressure modulation stage. The pressure modulation assembly 220 may also include a fixed-pressure relief valve (FRV) 224. The FRV 224 may be a normally-closed valve having a spring that biases the FRV 224 toward a closed position. As described in further detail below, the FRV 224 (e.g., the spring constant of the spring included in the FRV 224) may determine or control a maximum pressure level that the clutch pressure applied to the clutch 105 may reach. As mentioned above, the CCA 200 may also include a modular pressure relief valve (MRV) 230 in fluid communication with the valve assembly 210 and the pressure modulation assembly 220. The MRV 230 may be a normally-closed valve having a spring that biases the MRV 230 toward a closed position. The MRV 230 may have a pilot port in fluid communication with the valve assembly 210 and a reference port in fluid communication with the pressure modulation assembly 220. As described in further detail below, through the pilot port and the reference port, the MRV 230 may be configured to facilitate a hydraulic feedback loop 240 (represented with bold lining in FIG. 4 and including, for example, multi-position valve 215, pres-sure modulation orifice 221, pressure accumulator(s) 222, FRV 224, and MRV 230) between the valve assembly 210 and the pressure modulation assembly 220, such that an increase in a modulating pressure of the pressure modulation assembly 220 causes an increase in the clutch pressure applied to a clutch 105 in fluid communication with the CCA 200 in a continuous cycle, e.g., until the clutch pressure reaches the maximum pressure level determined by the FRV 224. The hydraulic feedback loop 240 may operate as an open loop hydraulic controller.

INDUSTRIAL APPLICABILITY

The devices and systems disclosed herein may find appli-cation in any machine that employs a clutch 105 to selec-tively couple and decouple an engine 110 (e.g., an internal combustion engine) and a transmission 111. In particular, the devices and system disclosed herein may be used in any machine for which it is desirable to modulate pressure applied to a clutch 105 included in the machine, or for which it is desirable to switch between automatic and manual operation of the clutch 105.

As mentioned above, a pressure modulating clutch control assembly (CCA) 200 may receive a pressurized fluid and use the pressurized fluid to apply a clutch pressure to a clutch 105 and/or increase the clutch pressure in a controlled or modulated manner. For example, the CCA 200 may cause a clutch pressure applied to a clutch 105 to increase in a series of stages, at least one of which is a pressure modulation stage in which the clutch pressure increases at a modulated rate. For example, FIG. 3 depicts a graph representing a series of pressurization stages facilitated by a CCA 200, with the horizontal axis representing time and the vertical axis representing clutch pressure level.

Figure 3:
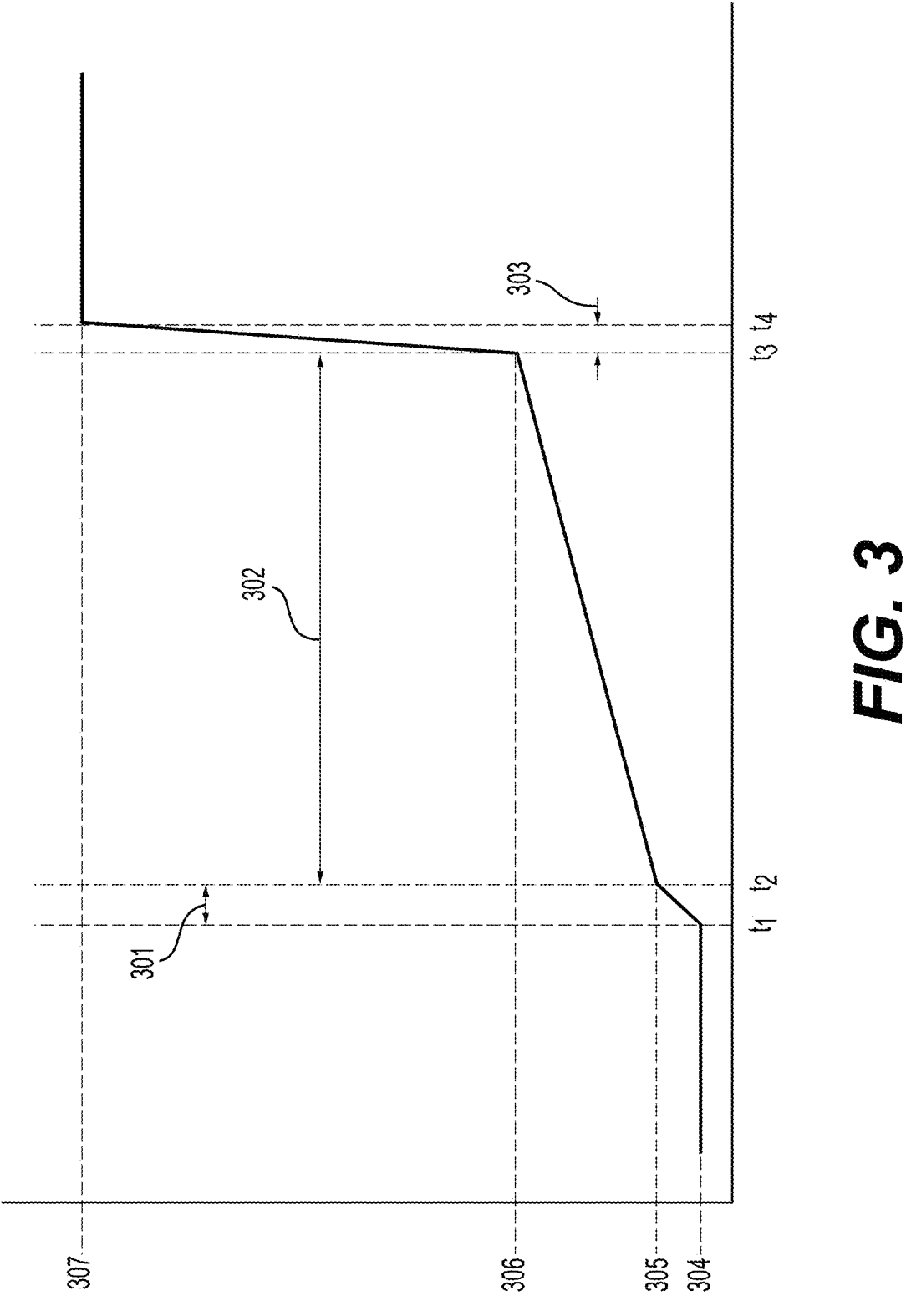
FIG. 3 depicts a chart representing a series of pressurization stages facilitated by a pressure modulating clutch control assembly.

For example, in the example depicted by FIG. 3, the CCA 200 causes a clutch pressure applied to a clutch 105 to increase in a series of three pressurization stages: 1) a first, clutch fill stage 301, in which the clutch pressure applied to the clutch 105 increases from a stand-by pressure level 304 to a touch-up pressure level 305 at a first unmodulated rate; 2) a second, pressure modulation stage 302, in which the clutch pressure applied to the clutch 105 increases from the touch-up pressure level 305 to a fully-engaged pressure level 306 at a modulated rate; and 3) a third, rapid pressurization stage 303, in which the clutch pressure applied to the clutch 105 increases from the full-engaged pressure level 306 to a maximum pressure level 307 at a second unmodulated rate. However, the CCA 200 may cause a clutch pressure applied to a clutch 105 to increase in any number of stages. The components of the CCA 200 may determine: the number of pressurization stages in which the clutch pressure increases, the various pressure levels (e.g., the stand-by pressure 304, the touch-up pressure level 305, the fully-engaged pressure 306, and the maximum pressure level 307) that the clutch pressure reaches during the various pressurization stages, the rates at which the clutch pressure increases during the various pressurization stages, and the lengths of the various pressurization stages.

As described above, in the state depicted by FIG. 2, because both the electrohydraulic clutch valve 212 and the manually-actuated clutch valve 214 have been actuated into their respective second (off) positions, no pressurized fluid is provided to the clutch 105. Thus, in this state (e.g., a disengaged state), the clutch pressure applied to the clutch 105 is at a resting and substantially constant stand-by pressure level 304.

In the state depicted by FIG. 4, because the selector valve 216 has been actuated into its first (electrohydraulic mode) position, thereby activating the electrohydraulic clutch valve 212 and deactivating the manually-actuated clutch valve 214, as soon as the electrohydraulic clutch valve 212 is actuated into its first (on) position, e.g., at time $t_1$ (FIG. 3), a pressurized fluid begins to flow through the electrohydraulic clutch valve 212 and then through the selector valve 216. In this example, the CCA 200 additionally includes a pilot-operated, multi-position valve 215 having a first (default) position in which the clutch 105 is in fluid communication with a tank 218 and a second (actuated) position in which the clutch 105 is in fluid communication with the valve assembly 210, such that the multi-position valve 215 is actuated into its second (actuated) position when a pilot fluid is allowed to flow through the CCA 200. Thus, when the pressurized fluid flows through the electrohydraulic clutch valve 212 and the selector valve 216, the pressurized fluid acts as a pilot fluid that actuates the multi-position valve 215 into its second (actuated) position, thereby allowing the pressurized fluid (acting now as a supply fluid) to flow through the multi-position valve 215, and then to the clutch 105. When the pressurized fluid is allowed to flow to the clutch 105, the clutch pressure increases accordingly, thereby beginning the clutch fill stage 301 (FIG. 3). During the pressurization stages facilitated by the CCA 200, the clutch pressure 105 may be substantially equivalent to the pressure of the pressurized fluid flowing through the valve assembly 210 of the CCA 200.

As depicted in FIG. 3, during the clutch fill stage 301, the clutch pressure applied to the clutch 105 increases from the stand-by pressure level 304 to the touch-up pressure level 305. The touch-up pressure level 305 is the pressure level at which the clutch disc of the clutch 105 first engages with the flywheel of the engine 110, as described above. Accordingly, before the clutch pressure reaches the touch-up pressure level 305, there is no resistance provided by the flywheel 114 to the clutch pressure increasing. Thus, between the time at which the clutch pressure begins increasing from the standby pressure level 304 in response to the pilot fluid flowing through the CCA 200 to the clutch 105, e.g., time $t_1$, and the time at which the clutch pressure reaches the touch-up pressure level 305, e.g., time $t_2$, the clutch pressure increases at a first uncontrolled or unmodulated rate.

As depicted in FIG. 4, when the pressurized fluid is allowed to flow through the valve assembly to the clutch 105, the pilot fluid is also allowed to flow to the pressure modulation orifice 221. The pressure modulation orifice 221 causes the pressurized fluid's path to the clutch 105 to be the path of least resistance for the pressurized fluid during the clutch fill stage 301. Accordingly, during the clutch fill stage 301, when there is no resistance provided by the flywheel 114 to the clutch pressure increasing, a first flow rate of the pressurized fluid to the clutch 105 (e.g., through the multi-position valve 215) is greater than a second flow rate of the pressurized fluid through the pressure modulation orifice 221. As a result, the pressure modulation assembly 220 is not able to affect the uncontrolled or unmodulated rate at which the clutch pressure applied to the clutch 105 increases during the clutch fill stage 301. For example, during the clutch fill stage 301, the displacement of the spring(s) included in the pressure accumulator(s) 222 is substantially unchanged. However, when the clutch pressure applied to the clutch 105 reaches the touch-up pressure level 305, thereby causing the clutch disc of the clutch 105 to engage with the flywheel 114, the flywheel 114 provides resistance to the clutch pressure increasing further, thereby ending the clutch fill stage 301 and beginning the pressure modulation stage 302. Although the touch-up pressure level 305 causes the clutch disc of the clutch 105 to engage with the flywheel 114, the touch-up pressure level 305 is lower than a pressure level that would prevent any slippage between the clutch disc and the flywheel 114 when engine 110 operates at maximum torque output.

During the pressure modulation stage 302, the clutch pressure applied to the clutch 105 increases from the touch-up pressure level 305 to the fully-engaged pressure level 306. The fully-engaged pressure level 306 is a pressure level at which the friction generated between the clutch disc of the clutch 105 and the flywheel 114 is unlikely to allow any discernible slippage between the flywheel 114 and the clutch disc of the clutch 105. During the pressure modulation stage 302, the clutch pressure applied to the clutch 105 increases at a modulated rate determined by the pressure modulation assembly 220. For example, once the clutch pressure reaches the touch-up pressure level 305, the resistance provided by the flywheel 114 causes the pressure modulation orifice 221 to become the path of least resistance for the pressurized fluid. At this stage, the pressurized fluid begins to simultaneously fill the pressure accumulator(s) 222, which may include a spring having a preload substantially equivalent to the touch-up pressure level 305, thereby increasing the pressure within the pressure accumulator(s) 222 and/or the pressure modulation assembly 220. The pressure within pressure accumulator(s) 222 and/or the pressure modulation assembly 220 may be referred to as a modulation pressure.

The spring(s) included in the pressure accumulator(s) 222 begin the pressure modulation stage 302 at a resting, initial position 223. Before the modulation pressure exceeds the preload of the spring(s) included in the pressure accumulator(s) 222, e.g., before the modulation pressure reaches the touch-up pressure level 305, such as during the clutch fill stage 301, the displacement of the spring(s) is unchanged. When the modulation pressure reaches the touch-up pressure level 305, e.g., at or just before the beginning of the pressure modulation stage 302, the resistance provided by the spring(s) of the pressure accumulator(s) 222 to the modulation pressure increasing is equal to the resistance provided by the flywheel 114 to the clutch pressure increasing. At this point, there is no single path of least resistance for the pilot fluid, and the clutch pressure and the modulation pressure begin to rise in tandem according to the hydraulic feedback loop 240, as described in further detail below. Because the flywheel 114 is fixed in position and cannot be displaced by the clutch pressure, when the modulation pressure exceeds the preload of the spring(s) included in the pressure accumulator(s) 222, the pressurized fluid within the pressure accumulator(s) 222 begins to displace the spring(s) within the pressure accumulator(s) 222 toward a final position 225. The displacement of the spring(s) within the pressure accumulator(s) 222 allows the modulation pressure and, by extension, the clutch pressure applied to the clutch 105, to increase at a controlled or modulated rate determined by the spring constant of the spring(s). The controlled or modulated rate may be further determined or limited by the size of the pressure modulation orifice 221. Thus, between the time at which the clutch pressure begins increasing from the touch-up pressure level 305 in response to the flywheel 114 providing resistance to the pressurized fluid and the displacement of the spring(s) within the pressure accumulator(s) 222 beginning to change, e.g., time $t_2$, and the time at which the clutch pressure reaches the fully-engaged pressure level 306, e.g., time $t_3$, the clutch pressure increases at a controlled or modulated rate. The duration of the pressure modulation stage 302, e.g., the difference between time $t_2$ and time $t_3$, may be determined by the volume of the pressure accumulator(s) 222.

As mentioned above, during the pressure modulation stage 302, the modulation pressure and the clutch pressure rise in tandem according to the hydraulic feedback loop 240 facilitated between the pressure modulation assembly 220 and the valve assembly 210. For example, as mentioned above, the CCA 200 may include a modular pressure relief valve (MRV) 230 having a pilot port in fluid communication with the valve assembly 210 and a reference port in fluid communication with the pressure modulation assembly 220, such that the MRV 230 is configured to relieve the valve assembly 210 to tank 218 if the clutch pressure exceeds the modulation pressure. Until the clutch pressure exceeds the modulation pressure, there is no other relief available for the valve assembly 210. Thus, during the pressure modulation stage 302, every incremental increase in the modulation pressure causes a proportional increase in the clutch pressure, in a continuous cycle, through the hydraulic feedback loop 240 facilitated between the pressure modulation assembly 220 and the valve assembly 210 through the MRV 230. The modulation pressure and the clutch pressure continue to increase in this way until the spring(s) included in the pressure accumulator(s) 222 reach the final position 225, which may correspond with the modulation pressure and the clutch pressure reaching the fully-engaged pressure level 306, thereby ending the pressure modulation stage 302 and beginning the maximum pressurization stage 303.

During the maximum pressurization stage 303, the clutch pressure increases from the fully-engaged pressure level 306 to the maximum pressure level 307. As mentioned above, the pressure modulation assembly 220 may include a fixed-pressure relief valve (FRV) 224 having a spring biasing the FRV 224 toward a closed position. During the maximum pressurization stage 303, because the spring(s) included in the pressure accumulator(s) 222 have reached the final position 225 and can be displaced no further by the pressurized fluid, and there is no other relief yet available for either the pressure modulation assembly 220 or the valve assembly 210, the modulation pressure increases at a second unmodulated rate until the modulation pressure exceeds a preload of the spring included in the FRV 224, thereby causing the FRV 224 to move toward an open position and relieve the pressure modulation assembly 220 to tank 218. Because of the hydraulic feedback 240 loop facilitated between the pressure modulation assembly 220 and the valve assembly 210, as described above, as the modulation pressure increases to the maximum pressure level 307 determined by the FRV 224 at the second unmodulated rate, so too does the clutch pressure. Thus, between the time at which the clutch pressure begins increasing from the fully-engaged pressure level 306 in response to spring(s) of the pressure accumulator(s) 222 reaching the final position 225, e.g., time $t_3$, and the time at which the clutch pressure reaches the maximum pressure level 307, e.g., time $t_4$, the clutch pressure increases at the second unmodulated rate. During the maximum pressurization stage 303, the displacement of the spring(s) included in the pressure accumulator(s) is substantially unchanged.

Once the modulation pressure reaches the maximum pressure level 307 and the FRV 224 relieves the pressure modulation assembly 220 to tank 218, the clutch pressure exceeds the modulation pressure, thereby causing MRV 230 to relieve the valve assembly 210 to tank 218, and the clutch pressure remains substantially at the maximum pressure level 307 until the pressurized fluid is no longer allowed to flow through the valve assembly 210, e.g., when the electrohydraulic clutch valve 212 is actuated into its second (off) position. When the pressurized fluid is no longer allowed to flow through the valve assembly 210, the multi-position valve 215 returns to its first (default) position, in which the clutch 105 is in fluid communication with tank 218, thereby allowing the pressurized fluid within the CCA 200 to drain to tank 218 and reducing the clutch pressure back to the stand-by pressure level 304.

As described above, the CCA 200 may additionally or alternatively allow the clutch 105 to be manually operated or electro-hydraulically operated, and/or facilitate toggling between manual operation of the clutch 105 and automatic operation of the clutch 105. For example, as depicted by FIGS. 2 and 4, the selector valve 216 may be actuated into a first (electrohydraulic mode) position that activates the electrohydraulic clutch valve 212 and deactivates the manually-actuated clutch valve 214. Because the electrohydraulic clutch valve 212 may be electronically actuated between its first (on) and second (off) positions, when the selector valve 216 is actuated into its first (electrohydraulic mode) position, a clutch 105 in fluid communication with the CCA 200 may be operated automatically, e.g., in response to commands from an ECM 130 operatively coupled to the CCA 200. Or for example, the selector valve 216 may be actuated into a second (manual mode) position that activates the manually-actuated clutch valve 214 and deactivates the electrohydraulic clutch valve 212. Because the manually-actuated clutch valve 214 may be manually actuated between its first (on) and second (off) positions, when the selector valve 216 is in its second (manual mode) position, a clutch 105 in fluid communication with the CCA 200 may be operated manually, e.g., in response to inputs received by a clutch mechanism 123 operatively coupled to the CCA 200.

By allowing a clutch pressure applied to a clutch 105 to increase at a controlled or modulated rate, the CCA 200 provides a machine 100 that employs the CCA 200 with a smoother, more consistent, and safer clutch engagement. For example, when the clutch pressure applied to the clutch 105 increases at a controlled or modulated rate, an operator of the machine 100 will not experience a lurch or jolt during the clutch engagement. By allowing a clutch 105 to be alternatingly manually operated or automatically operated, the CCA 200 provides a machine 100 that employs the CCA 200 with greater operational flexibility and operational redundancy. For example, if the machine 100 experiences an electrical failure, an operator of the machine 100, e.g., a driver, will still be able to operate the machine 100 to prevent the machine 100 from stalling. Or for example, an operator of the machine 100 may be able to remotely or locally engage the clutch 105.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A pressure modulating clutch control assembly, comprising:
   a valve assembly configured to apply a clutch pressure to a clutch device;
   a pressure modulation assembly in fluid communication with the valve assembly and configured to control a maximum pressure level that the clutch pressure reaches; and
   a modular relief valve in fluid communication with the valve assembly and the pressure modulation assembly, the modular relief valve forming part of a hydraulic feedback loop between the valve assembly and the pressure modulation assembly,
   wherein the hydraulic feedback loop is configured such that an increase in a modulation pressure of a pressurized fluid within the pressure modulation assembly causes a corresponding increase in the clutch pressure until the clutch pressure reaches the maximum pressure level.

2. The clutch control assembly of claim 1, wherein the pressure modulation assembly includes:
   at least one pressure modulation orifice and at least one pressure accumulator, the at least one pressure modulation orifice and the at least one pressure accumulator configured to function cooperatively to determine a modulated rate at which both the modulation pressure and clutch pressure increase; and
   a fixed-pressure relief valve, the fixed-pressure relief valve configured to determine the maximum pressure level.

3. The clutch control assembly of claim 2, wherein the valve assembly further comprises a pilot-operated, multi-position valve, and wherein the valve assembly is further operative to apply the clutch pressure to the clutch device by directing the pressurized fluid through the pilot-operated, multi-position valve.

4. The clutch control assembly of claim 3, wherein the modular relief valve is further configured to relieve the valve assembly when the clutch pressure reaches the maximum pressure level.

5. The clutch control assembly of claim 2, wherein the at least one pressure accumulator includes an accumulator spring.

6. The clutch control assembly of claim 1, wherein the valve assembly and the pressure modulation assembly are configured to function cooperatively to apply the clutch pressure to the clutch device in a series of stages, including:
   a clutch fill stage, in which the clutch pressure applied to the clutch device increases from a standby pressure level to a touch-up pressure level at a first unmodulated rate;
   a pressure modulation stage, in which the clutch pressure applied to the clutch device increases from the touch-up pressure level to a fully-engaged pressure level at a modulated rate; and
   a maximum pressurization stage, in which the clutch pressure applied to the clutch device increases from the fully-engaged pressure level to the maximum pressure level at a second unmodulated rate.

7. The clutch control assembly of claim 1, wherein the valve assembly includes a manually-actuated clutch valve, an electrohydraulic clutch valve, and a selector valve operative to selectively activate or deactivate the manually-actuated clutch valve and the electrohydraulic clutch valve.

8. A pressure modulating clutch control assembly, comprising:
   a valve assembly in fluid communication with a clutch device;
   a pressure modulation assembly in fluid communication with the valve assembly, the valve assembly and the pressure modulation assembly being configured to function cooperatively to apply a clutch pressure to the clutch device in a series of stages, including:
   a clutch fill stage, in which the clutch pressure applied to the clutch device increases from a standby pressure level to a touch-up pressure level at a first unmodulated rate,
   a pressure modulation stage, in which the clutch pressure applied to the clutch device increases from the touch-up pressure level to a fully-engaged pressure level at a modulated rate, and
   a maximum pressurization stage, in which the clutch pressure applied to the clutch device increases from the fully-engaged pressure level to a maximum pressure level at a second unmodulated rate; and
   a modular relief valve in fluid communication with the valve assembly and the pressure modulation assembly, the modular relief valve configured to:
   facilitate a hydraulic feedback loop between the valve assembly and the pressure modulation assembly, such that an increase in a modulating pressure of the pressure modulation assembly causes a proportional increase to the clutch pressure in a continuous cycle until the clutch pressure reaches the maximum pressure level, and
   when the clutch pressure reaches the maximum pressure level, relieve the valve assembly, such that the clutch pressure applied to the clutch device is not allowed to exceed the maximum pressure level.

9. The pressure modulating clutch control assembly of claim 8, wherein the pressure modulation assembly includes a fixed-pressure relief valve, the fixed-pressure relief valve configured to determine the maximum pressure level.

10. The pressure modulating clutch control assembly of claim 8, wherein the pressure modulation assembly includes at least one pressure modulation orifice and at least one pressure accumulator, the at least one pressure modulation orifice and the at least one pressure accumulator configured to function cooperatively to determine the modulated rate at which the clutch pressure applied to the clutch device increases from the touch-up pressure level to the fully-engaged pressure level during the pressure modulation stage.

11. The pressure modulating clutch control assembly of claim 10, wherein the at least one pressure accumulator includes a spring having a preload substantially equivalent to the touch-up pressure level.

12. The pressure modulating clutch control assembly of claim 11, wherein a displacement of the spring is substantially unchanged during the clutch fill stage.

13. The pressure modulating clutch control assembly of claim 11, wherein a displacement of the spring is substantially unchanged during the maximum pressurization stage.

14. The pressure modulating clutch control assembly of claim 10, wherein the valve assembly further comprises a pilot-operated, multi-position valve, and wherein the valve assembly is further operative to apply pressure to the clutch device by directing a pressurized fluid through the pilot-operated, multi-position valve.

15. The pressure modulating clutch control assembly of claim 10, wherein a first flow rate of the pressurized fluid through to the clutch device is greater than a second flow rate of the fluid through the pressure modulation orifice during the clutch fill stage.

16. The pressure modulating clutch control assembly of claim 8, wherein the valve assembly includes a manually-actuated clutch valve, an electrohydraulic clutch valve, and a selector valve operative to selectively activate or deactivate the manually-actuated clutch valve and the electrohydraulic clutch valve.

17. A pressure modulating clutch control assembly, comprising:

a valve assembly in fluid communication with a clutch device and including a manually-actuated clutch valve, an electrohydraulic clutch valve, and a selector valve operative to selectively activate or deactivate the manually-actuated clutch valve and the electrohydraulic clutch valve; and a pressure modulation assembly, wherein, when either the manually-actuated clutch valve or the electrohydraulic clutch valve is activated by the selector valve, the valve assembly and the pressure modulation assembly function cooperatively to apply a clutch pressure to the clutch device and modulate the clutch pressure applied to the clutch device.

18. The pressure modulating clutch control assembly of claim 17, further comprising a modular relief valve in fluid communication with the valve assembly and the pressure modulation assembly, the modular relief valve configured to:

facilitate a hydraulic feedback loop between the valve assembly and the pressure modulation assembly, such that an increase in a modulating pressure of the pressure modulation assembly causes a proportional increase to the clutch pressure in a continuous cycle until the clutch pressure reaches a maximum pressure level, and when the clutch pressure reaches the maximum pressure level, relieve the valve assembly, such that the clutch pressure applied to the clutch device is not allowed to exceed the maximum pressure level.

19. The pressure modulating clutch control assembly of claim 17, wherein the valve assembly and the pressure modulation assembly are configured to function cooperatively to apply the clutch pressure to the clutch device in a series of stages, including:

a clutch fill stage, in which the clutch pressure applied to the clutch device increases from a standby pressure level to a touch-up pressure level at a first unmodulated rate;

a pressure modulation stage, in which the clutch pressure applied to the clutch device increases from the touch-up pressure level to a fully-engaged pressure level at a modulated rate; and a rapid pressurization stage, in which the clutch pressure applied to the clutch device increases from the fully-engaged pressure level to a maximum pressure level at a second unmodulated rate.

\* \* \* \* \*